Oct. 25, 1938.　　　G. GALWEY　　　2,133,982
RESILIENT FENDER AND BUMPER FOR VEHICLES
Filed June 29, 1937
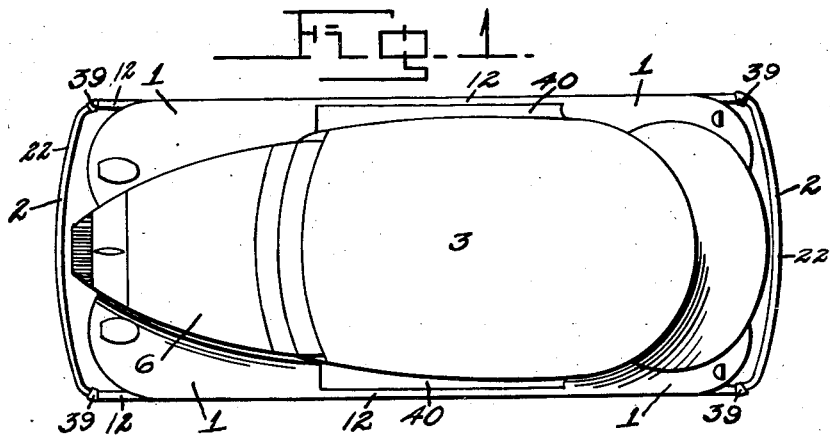
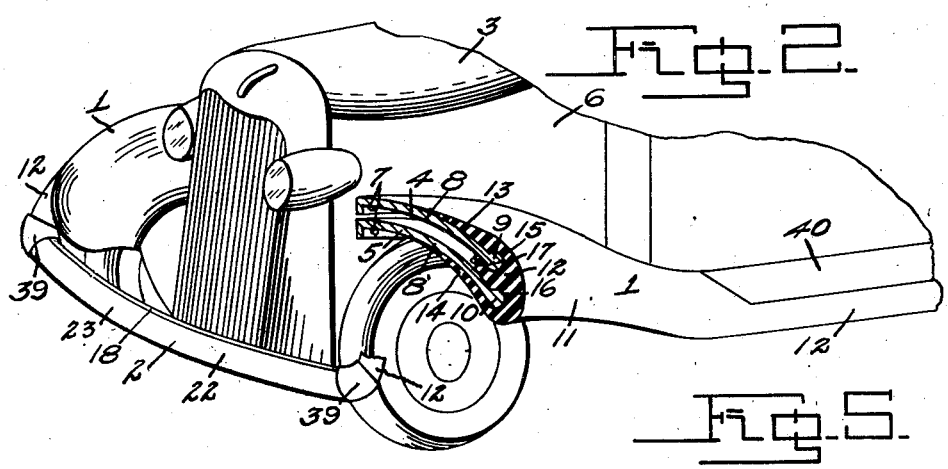
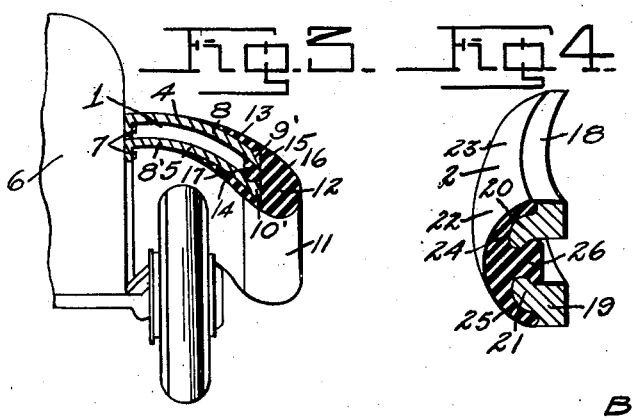
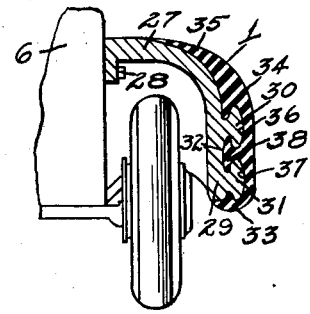
INVENTOR
Geoffrey Galwey
BY
Adam Richmond
Attorney Patented Oct. 25, 1938

2,133,982

UNITED STATES PATENT OFFICE 2,133,982

RESILIENT FENDER AND BUMPER FOR VEHICLES

Geoffrey Galwey, Fort Meade, S. Dak.

Application June 29, 1937, Serial No. 150,931

5 Claims. (Cl. 280—152)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to motor vehicles, more particularly it is directed to devices for protecting vehicles against damage.

An object of the invention is to provide fenders and bumpers of improved construction for motor vehicles, including resilient guards for effectively cushioning, absorbing shocks and preventing the fenders and bumpers from being dented, bent or otherwise disfigured from contact with obstacles such as other vehicles and which preserve the original shape thereof.

With the above and other objects and advantages in view, the invention consists of features of construction and arrangement of parts which will hereinafter appear. For purposes of illustration the invention may be described and claimed with reference to the accompanying drawing in which like numbers distinguish like parts and in which—

Fig. 1 is a top plan view of a motor vehicle having my invention applied thereto;

Fig. 2 is a perspective view partly in section of an improved fender and bumper, including resilient guards and so much of a vehicle as is necessary to show their connection therewith;

Fig. 3 is a cross-sectional view of the improved fender and guard secured to a vehicle;

Fig. 4 is a perspective view partly in section, showing the construction of the bumper and its resilient guard;

Fig. 5 is a cross-sectional view of a modified form of fender and guard applied to a vehicle.

In the illustrated embodiment characterizing my invention, the improved fenders 1 and bumpers 2 are shown in Fig. 1 as applied to a vehicle 3, both on the front and rear ends thereof.

The fenders 1 comprise two metallic base members 4 and 5, which are suitably curved longitudinally as illustrated in Figs. 2 and 3, to provide a fender which covers only the upper portion of the wheels of a vehicle. The metallic members 4 and 5 are adapted to be separately and rigidly secured to the body 6 of the vehicle by rivets 7, or in any other suitable manner such as by being welded thereto, and extend substantially straight outward, one on top of the other from the body 6 of the vehicle in spaced parallel relation to each other and are cross-sectioned in the form of curved plates 7 and 8 from the outer longitudinal edge of which project enlarged beads or tongues 9 and 10, respectively, which are substantially round in cross-section. In Fig. 3 the tongues 9' and 10' are substantially in the shape of truncated wedges in cross-section. Secured to the base members 4 and 5 is a cushioning member or element 11, preferably of resilient rubber, which is co-extensive in length with the base members so as to provide a yieldable facing therefor. The cushioning member 11 comprises a face or body portion 12 having inwardly tapered wing-like extensions 13 and 14, the whole being moulded into an integral one-piece finished form. The body portion 12 of the cushioning member 11 is provided with longitudinal grooves 15 and 16 produced by an inwardly extending central longitudinal flange portion 17, which is substantially T-shaped in cross-section. The beaded longitudinal edges 9 and 10, or 9' and 10', respectively, of the base members 4 and 5, are adapted to interlock within the grooves 15 and 16 of the cushioning member 11 with the central portion 17 of the cushioning members, engaging the inner surfaces of the base members, to form a unitary structure therewith. The cushioning member 11 is moulded or vulcanized to the metallic base members 4 and 5 at its contacting surfaces with the upper tapered extension 13 of the cushioning member overlying the outer portion of the base member 4 and the lower tapered extension 14 thereof underlying the outer surface of the lower base member 5. By projecting the metallic base members 4 and 5 substantially straight outward from the body 6 of the vehicle and forming the enlarged beads 9 and 10, or 9' and 10', on the outer longitudinal edges thereof, greater resistance against collision of the vehicle with another vehicle is insured.

The improved bumpers 2 comprise parallel bars 18 and 19, each of which is provided with a longitudinal curbed bead or tongue 20 and 21, respectively, on the front edge thereof, the said beads 20 and 21 being in opposed spaced relation to each other. A cushioning member or element 22 is provided on the bars 18 and 19, and comprises a bumper face 23 having a pair of dovetailed grooves 24 and 25 provided therein, which are produced by a central longitudinal member 26 substantially T-shaped in cross section. The cushioning member 22 may be moulded or vulcanized on the bumper bars 18 and 19, or preformed separately and slipped on the beads 20 and 21 of the bars.

The modified form of fender construction as illustrated in Fig. 5, which is adapted to cover the side of the wheels of a vehicle, comprises a single metallic base or foundation member 27, which is adapted to be rigidly secured to the body 6 of the vehicle by rivets 28, or in any other suitable manner. The base member 27 extends substantially straight or horizontally outward from the body 6 of the vehicle and is curved to form a vertical extending apron portion 29 having parallel longitudinal tongues or retaining elements 30 and 31 on the outer surface thereof, which are substantially T-shaped in cross-section with rounded ends and provide a longitudinal groove 32, substantially T-shaped in cross-section. Secured to the base member 27, by being moulded or vulcanized thereto, is a cushioning element 33, which comprises a face or body portion 34 having a wing-like tapering extension 35 provided on the upper end thereof, which is adapted to overlie the upper surface of the base member 27. The face portion 34 of the cushioning element 33 is provided with longitudinal grooves 36 and 37, each of which are substantially T-shaped in cross-section and provide a T-shaped member 38 on the cushioning member. The grooves 36 and 37 in the cushioning element 33 interlock with the tongues 30 and 31, respectively, of the base member 27, and the member 38 of the cushioning element interlocks with the groove 32 of the base member.

Referring to Figs. 1 and 2, the face or body portion 12 of the cushioning member 11 of the fenders, together with the beads 9 and 10, or 9' and 10', of the base members 4 and 5, are extended out from the fenders and joined to the ends of the bumpers by any suitable means, such as by the connecting plates or brackets 39. The face portion 12 of the cushioning member 9 may be extended along the outer edge of the running boards 40 of the vehicle. In a vehicle provided with narrow or no running boards the cushioning member may be eliminated therefrom.

It is desirable that the cushioning members or guards as applied to the fenders and bumpers should be painted or lacquered to conform to the same color of the vehicle, so as to be practically unnoticeable and not detract from the appearance thereof.

By constructing fenders and bumpers for vehicles with resilient elements as above described, they will be protected against injurious contact and also aid in absorbing more serious shocks to further protect the vehicle against damage and its occupants against injuries. Also by connecting the bumpers to the fenders the possibility of one vehicle hooking or interlocking with another vehicle is avoided.

It will thus be seen that I have provided a highly novel and efficient form of bumpers and fenders for vehicles, including a resilient guard for the bumpers and fenders which is well adapted for all the purposes indicated. Even though I have herein shown and described my invention as comprising certain details of construction, it will nevertheless be understood that various changes may be made therein without departing from the spirit or scope of the invention.

Having described my invention, what I claim as new and wish to secure by Letters Patent is:

1. A fender guard comprising in combination a pair of spaced parallel base members having enlarged tongues on their longitudinal outer edges and a resilient cushion mounted on said base members, said cushion comprising a body portion having a longitudinal member and tapering extensions, said member being substantially T-shaped in cross-section and forming longitudinal grooves which interlock with the tongues of said base members.

2. A fender comprising in combination a metal base member having a horizontally and a vertically extending portion thereon, a pair of longitudinal retaining elements on said vertically extending portion of said base member, a groove provided on said base member and formed by said retaining elements, said retaining elements and said groove being substantially T-shaped in cross-section and a resilient cushion, a tapering portion, a horizontal retaining member and a pair of grooves provided on said cushion, said grooves of said cushion interlocking with the retaining elements of said base member and said retaining member of said cushion interlocking with the groove of said base member.

3. A guard comprising in combination a pair of substantially parallel base members having beads on their outer edges and a resilient cushion element interlocking with said beads and incasing said base members.

4. A guard comprising in combination a pair of spaced parallel base members and a resilient cushion element moulded on said base members, said cushion element having tapering extensions and grooves provided thereon, said extensions covering said base members and said grooves interlocking with the outer edges of the base members.

5. A fender guard comprising in combination a pair of spaced substantially parallel base members having enlarged tongues on their outer edges and a resilient cushion element moulded on said base members, said cushion element including a member clamped between the tongues of said base members, grooves interlocking with said tongues and tapering extensions substantially covering said base members.

GEOFFREY GALWEY.